(12) United States Patent
Selevan et al.

(10) Patent No.: US 10,660,183 B2
(45) Date of Patent: May 19, 2020

(54) DEVICES AND METHODS FOR SYNCHRONIZED SIGNALING OF THE POSITIONS OF MOVING PEDESTRIANS OR VEHICLES

(71) Applicants: James R Selevan, Laguna Beach, CA (US); Adam Jordan Selevan, Laguna Beach, CA (US); Daniel Joseph Selevan, Laguna Beach, CA (US)

(72) Inventors: James R Selevan, Laguna Beach, CA (US); Adam Jordan Selevan, Laguna Beach, CA (US); Daniel Joseph Selevan, Laguna Beach, CA (US)

( * ) Notice: Subject to any disclaimer, the term of this patent is extended or adjusted under 35 U.S.C. 154(b) by 0 days.

(21) Appl. No.: 16/029,379

(22) Filed: Jul. 6, 2018

(65) Prior Publication Data
US 2019/0045599 A1 Feb. 7, 2019

Related U.S. Application Data

(60) Provisional application No. 62/529,423, filed on Jul. 6, 2017.

(51) Int. Cl.
| | |
|---|---|
| *H05B 47/155* | (2020.01) |
| *B60Q 1/30* | (2006.01) |
| *B60Q 5/00* | (2006.01) |
| *B62J 3/00* | (2020.01) |
| *B62J 6/00* | (2020.01) |
| *G08G 1/16* | (2006.01) |

(Continued)

(52) U.S. Cl.
CPC ............ *H05B 47/155* (2020.01); *B60Q 1/30* (2013.01); *B60Q 1/46* (2013.01); *B60Q 5/00* (2013.01); *B62J 3/00* (2013.01); *B62J 6/001* (2013.01); *B62J 6/003* (2013.01); *B62J 6/02* (2013.01); *B62J 27/00* (2013.01); *G08G 1/161* (2013.01); *H05B 47/16* (2020.01); *H05B 47/19* (2020.01); *B62J 2006/008* (2013.01); *B62J 2099/008* (2013.01)

(58) Field of Classification Search
CPC .... H05B 37/029; H05B 47/155; H05B 47/19; H05B 47/16; B60Q 1/30; B60Q 5/00; B60Q 1/46; B62J 3/00; B62J 6/001; B62J 6/003; B62J 6/02; B62J 27/00; B62J 2006/008; B62J 2099/008; G08G 1/161
See application file for complete search history.

(56) References Cited

U.S. PATENT DOCUMENTS

| | | |
|---|---|---|
| 3,500,378 A | 3/1970 | Pickering et al. |
| 3,787,867 A | 1/1974 | Dodge et al. |

(Continued)

FOREIGN PATENT DOCUMENTS

| | | |
|---|---|---|
| WO | WO 2014/130842 A1 | 8/2014 |
| WO | WO 2016/070193 A1 | 5/2016 |

OTHER PUBLICATIONS

Finley, M.D. et al., "Sequential Warning Light System for Work Zone Lane Closures," Texas Transportation System, (2011) pp. 1-23.

(Continued)

*Primary Examiner* — Mohamed Barakat
(74) *Attorney, Agent, or Firm* — Robert D. Buyan; Stout, Uxa & Buyan, LLP (57) ABSTRACT

Position indicating devices, systems and methods useable for signaling the positions of pedestrians or vehicles.

12 Claims, 4 Drawing Sheets

(51) Int. Cl.
  *B60Q 1/46* (2006.01)
  *B62J 27/00* (2020.01)
  *B62J 6/02* (2020.01)
  *H05B 47/16* (2020.01)
  *H05B 47/19* (2020.01)
  *B62J 99/00* (2020.01)

(56) References Cited

U.S. PATENT DOCUMENTS

| | | |
|---|---|---|
| 3,846,672 A | 11/1974 | Doughty |
| 4,132,983 A | 1/1979 | Shapiro |
| 4,249,159 A | 2/1981 | Stasko |
| 4,345,305 A | 8/1982 | Kolm et al. |
| 4,827,245 A | 5/1989 | Lipman |
| 4,841,278 A | 6/1989 | Tezuka et al. |
| 5,294,924 A | 3/1994 | Dydzyk |
| 5,345,232 A | 9/1994 | Robertson |
| 5,438,495 A | 8/1995 | Ahlen et al. |
| 5,673,039 A | 9/1997 | Pietzsch et al. |
| 5,754,124 A | 5/1998 | Daggett et al. |
| 6,299,379 B1 | 10/2001 | Lewis |
| 6,332,077 B1 | 12/2001 | Wu et al. |
| 6,486,797 B1 | 11/2002 | Laidman |
| 6,549,121 B2 | 4/2003 | Povey et al. |
| 6,614,358 B1 | 9/2003 | Hutchison et al. |
| D498,164 S | 11/2004 | Delich |
| 6,929,378 B2 | 8/2005 | Wang |
| D510,289 S | 10/2005 | Dueker et al. |
| 6,963,275 B2 | 11/2005 | Smalls |
| D515,957 S | 2/2006 | Dueker et al. |
| D515,958 S | 2/2006 | Dueker et al. |
| 7,088,222 B1 | 8/2006 | Dueker et al. |
| 7,106,179 B1 | 9/2006 | Dueker et al. |
| 7,182,479 B1 | 2/2007 | Flood et al. |
| 7,277,809 B1 | 10/2007 | DeWitt, Jr. et al. |
| 7,298,244 B1 | 11/2007 | Cress et al. |
| 7,301,469 B1 | 11/2007 | Hoffman et al. |
| D560,533 S | 1/2008 | Dueker et al. |
| D564,387 S | 3/2008 | Rubin et al. |
| 7,455,419 B2 | 11/2008 | Helget et al. |
| 7,563,158 B2 | 7/2009 | Haschke et al. |
| D631,582 S | 1/2011 | Hwang |
| 8,072,345 B2 | 12/2011 | Gallo |
| D654,387 S | 2/2012 | Wilson et al. |
| 8,154,424 B2 | 4/2012 | Selevan |
| 8,220,950 B1 | 7/2012 | Sunshine |
| D669,805 S | 10/2012 | Edwards et al. |
| D678,100 S | 3/2013 | Hwang |
| 8,550,653 B2 | 10/2013 | Wilson et al. |
| 8,564,456 B2 | 10/2013 | Selevan |
| 8,579,460 B2 | 11/2013 | Wilson et al. |
| 8,602,584 B2 | 12/2013 | Ghafoori et al. |
| 8,643,511 B1 | 2/2014 | Batterson |
| 8,786,461 B1 | 7/2014 | Daudelin |
| 8,949,022 B1 | 2/2015 | Fahrner et al. |
| 9,066,383 B2 * | 6/2015 | Gerszberg .......... H05B 33/0857 |
| 9,288,088 B1 | 3/2016 | McIlroy |
| 9,437,109 B1 | 9/2016 | Stafford et al. |
| 9,489,809 B1 * | 11/2016 | Dever .................... G02B 27/01 |
| D778,752 S | 2/2017 | Selevan |
| D778,753 S | 2/2017 | Selevan |
| 9,835,319 B2 | 12/2017 | Selevan et al. |
| 2002/0036908 A1 | 3/2002 | Pederson |
| 2002/0067290 A1 | 6/2002 | Peet, II et al. |
| 2002/0154787 A1 | 10/2002 | Rice et al. |
| 2002/0159251 A1 | 10/2002 | Hart |
| 2002/0164666 A1 | 11/2002 | Cimbora et al. |
| 2002/0175831 A1 | 11/2002 | Bergan et al. |
| 2004/0056779 A1 | 3/2004 | Rast |
| 2004/0100396 A1 | 5/2004 | Antico et al. |
| 2004/0113817 A1 | 6/2004 | Novak et al. |
| 2004/0124993 A1 | 7/2004 | George |
| 2004/0183694 A1 | 9/2004 | Bauer |
| 2005/0040970 A1 | 2/2005 | Hutchins et al. |
| 2005/0210722 A1 | 9/2005 | Graef et al. |
| 2005/0248299 A1 | 11/2005 | Chemel et al. |
| 2006/0072306 A1 | 4/2006 | Woodyard |
| 2006/0104054 A1 | 5/2006 | Coman |
| 2006/0165025 A1 | 7/2006 | Singh et al. |
| 2007/0038743 A1 | 2/2007 | Hellhake et al. |
| 2007/0099625 A1 | 5/2007 | Rosenfeld |
| 2007/0115139 A1 | 5/2007 | Witte et al. |
| 2007/0153520 A1 | 7/2007 | Curran et al. |
| 2007/0155139 A1 | 7/2007 | Hecht et al. |
| 2007/0194906 A1 | 8/2007 | Sink |
| 2007/0222640 A1 | 9/2007 | Guelzow et al. |
| 2007/0273509 A1 | 11/2007 | Gananathan |
| 2008/0037431 A1 | 2/2008 | Werb et al. |
| 2008/0042866 A1 | 2/2008 | Morse et al. |
| 2008/0091304 A1 | 4/2008 | Ozick et al. |
| 2008/0122607 A1 | 5/2008 | Bradley |
| 2008/0242220 A1 | 10/2008 | Wilson et al. |
| 2008/0267259 A1 | 10/2008 | Budampati et al. |
| 2009/0034419 A1 | 2/2009 | Flammer, III et al. |
| 2009/0115336 A1 | 5/2009 | Wang |
| 2009/0187300 A1 | 7/2009 | Everitt |
| 2010/0259199 A1 | 10/2010 | McDermott |
| 2011/0249430 A1 | 10/2011 | Stamatatos et al. |
| 2011/0249688 A1 | 10/2011 | Liu |
| 2012/0256765 A1 | 10/2012 | Selevan |
| 2012/0277934 A1 | 11/2012 | Ohtomo et al. |
| 2012/0287611 A1 | 11/2012 | Wilson et al. |
| 2013/0113634 A1 | 5/2013 | Hutchinson et al. |
| 2013/0221852 A1 | 8/2013 | Bowers et al. |
| 2013/0260695 A1 | 10/2013 | Wang |
| 2013/0271294 A1 * | 10/2013 | Selevan .................. G08G 1/095 |
| | | 340/907 |
| 2013/0293396 A1 | 11/2013 | Selevan |
| 2014/0126187 A1 | 5/2014 | Bennett et al. |
| 2014/0210373 A1 | 7/2014 | Baret |
| 2015/0077234 A1 | 3/2015 | Fullam |
| 2015/0366275 A1 | 12/2015 | Cserfoi |
| 2016/0174099 A1 * | 6/2016 | Goldfain ................ G06F 19/00 |
| | | 375/130 |
| 2016/0186971 A1 | 6/2016 | Selevan et al. |
| 2016/0248506 A1 | 8/2016 | Ryan et al. |
| 2017/0097128 A1 | 4/2017 | Stafford |
| 2017/0354019 A1 * | 12/2017 | Julian ................ H05B 37/0272 |

OTHER PUBLICATIONS

Sun, C. et al., "Cost-Benefit Analysis of Sequential Warning Lights in Nighttime Work Zone Tapers", University of Missouri, Report to the Smart Work Zone Deployment Initiative, Jun. 6, 2011.
Internet Website Screen Capture, www.empco-lite.com; Sep. 6, 2010.
PCT International Search Report dated Apr. 27, 2018 in PCT Application No. PCT/US2018/017683.
PCT International Search Report dated May 28, 2014 in PCT Application US2014/017756.
PCT International Search Report dated Mar. 18, 2016 in PCT Application No. PCT/US2015/060770.
PCT International Search Report dated Oct. 26, 2018 in related PCT Application No. PCT/US2018/041126.
Extended European Search Report dated Jun. 20, 2018 in related European Application No. 15858697.4.

* cited by examiner

DEVICES AND METHODS FOR SYNCHRONIZED SIGNALING OF THE POSITIONS OF MOVING PEDESTRIANS OR VEHICLES

RELATED APPLICATION

This application claims priority to U.S. Provisional Patent Application No. 62/529,423 entitled Synchronized Behavior of Bicycle, Motorcycle, and Pedestrian Warning Devices filed on Jul. 6, 2017, the entire disclosure of which is expressly incorporated herein by reference.

FIELD OF THE INVENTION

The present invention relates generally to the fields of electronics and traffic engineering and more particularly to systems and methods for transmitting visibility-enhancing or warning signals from group(s) of moving pedestrians or vehicles.

BACKGROUND

Pursuant to 37 CFR 1.71(e), this patent document contains material which is subject to copyright protection and the owner of this patent document reserves all copyright rights whatsoever.

Pedestrians (e.g., runners, joggers, walkers, etc.) and occupants of certain vehicles (e.g., bicyclists, motorcyclists, drivers of slower-moving or otherwise vulnerable vehicles) can be susceptible to injury due to vehicular impact. Such pedestrians and vehicles sometimes travel or move along a roadway in groups of two or more. For example, a peloton of bicyclists might include 20 to 50 or more riders. When spread out in the direction of travel in the early morning or evening, front and/or rear lights attached to the bicycles may flash to provide warning to approaching drivers of motor vehicles. However, to the approaching vehicle driver, this may appear from a distance as random flashing lights without giving the oncoming driver a clear appreciation of the overall size of the group.

Existing warning lamps installed on bicycles, motorcycles and other moving vehicles flash to warn approaching drivers. The individual flash of either a forward or rear facing lamp has limited energy and, therefore, limited visual light output owing to available power and reflector surface area. Improvements in efficiency (LED versus incandescent) of the light source, sophisticated optic, and improved battery technology have led to better warning lights. However, injury as a result of impact continues and with increasing frequency. There is a need for improvements in warning light optics, power, and efficiency. Pedestrians suffer the same disadvantage when walking along a roadside. Groups of children walking to school, for example, in the early morning hours of winter are difficult to see in the darkness. Flashing lamps on the backpacks, headgear, shoes or garments worn by such pedestrians can make them more visible to oncoming drivers.

In accordance with this invention, such flashing lamps may flash in synchrony or unison or otherwise emit light in synchrony or unison (e.g., solid non flashing, pattern-flashing, etc.) when several pedestrians or vehicles are moving in a group, thereby enhancing the perceived brightness and size of the emitted light and rendering the group more visible to oncoming traffic.

SUMMARY

In accordance with one aspect of the present disclosure, there are provided position indicating devices which emit synchronized position indicating signals when moving within a particular distance range (i.e., a synchronization range) of other ones of such moving devices. In some embodiments, these devices may be in the form of electronic flares which emit flashes of light or other signals, examples of such flares being described in U.S. Pat. Nos. 7,088,222; 7,106,179; 8,154,424; 8,550,653; 8,564,456; 8,579,460; 9,288,088; 9,835,319; D510,289; D515,957; D515,958; D560,533; D654,387; D669,805; D778,752 and D778,753 as well as United States Patent Application Publication Nos. 2013/0113634; 2016/0186971 and pending U.S. patent application Ser. No. 15/893,420, the entire disclosure of each such patent and application being expressly incorporated herein by reference. In some embodiments, these devices may be attached to or integrated/manufactured on or in a vehicle, vehicle accessory or other object, such as, for example, vehicles, bicycles, bicycle seats, bicycle lamps, motorcycles, motorbikes, wearable garments, vests, shoes, running shoes, headgear, caps, hats, helmets, hard hats, straps, leg straps, arm straps, belts, back-packs, lanyards, jewelry, ear rings, necklaces and wrist bands.

In accordance with another aspect of the present disclosure, there are provided position indicating devices which are operable while moving along with other such devices, wherein each such device comprises: at least one emitter which emits a position indicating signal; a radio or other receiver (which may include a transmitter as well); a power source; and electronic circuitry configured and programmed to a) receive synchronization signal(s), via the receiver, from other position indicating devices located within a synchronization range of said device; and b) in response to the receipt of one or more synchronization signal(s) from one or more other position indicating devices located within the synchronization range, causing said at least one emitter to emit a signal that is synchronized with signals being emitted by said one or more other position indicating devices located within the synchronization range.

In accordance with another aspect of the present disclosure, there is provided a method for using a plurality of position indicating devices to indicate the positions of a plurality of moving pedestrians or vehicles, said method comprising the step of causing each of said pedestrians or vehicles to be equipped with at least one of said devices, each of said devices comprising an emitter which emits position indicating signals and control apparatus programmed to i) sense when that device is within a synchronization range of one or more of the other devices and, when within said synchronization distance range of one or more others of said devices and, ii) cause that device's emitter to emit a position indicating signal that is synchronized with position indicating signals being emitted by said one or more of the others of said devices that are positioned within the synchronization range.

Further aspects and details of the present invention will be understood upon reading of the detailed description and examples set forth herebelow.

BRIEF DESCRIPTION OF THE DRAWINGS

The following detailed description and examples are provided for the purpose of non-exhaustively describing some, but not necessarily all, examples or embodiments of the invention, and shall not limit the scope of the invention in any way.

DETAILED DESCRIPTION

The following detailed description and the accompanying drawings to which it refers are intended to describe some, but not necessarily all, examples or embodiments of the invention. The described embodiments are to be considered in all respects only as illustrative and not restrictive. The contents of this detailed description and the accompanying drawings do not limit the scope of the invention in any way.

When several bicyclists are riding along the side of a road, their warning lamps may blend in with ambient and infrastructure lamps placed for multiple purposes. For example, light emanating from store fronts, crossing automobiles, retail buildings, etc., all will tend to obscure the flashing warning lamp of the bicyclist. Also, when vehicles attempt to travel in a group, such as a funeral procession, military vehicle convoy, etc., it is sometimes difficult for other vehicles traveling on the same roadway to visually perceive the existence or extent of such group. The present invention provides signaling devices and systems which may be embodied in, held, carried, worn or affixed to such pedestrians or vehicles and are programmed to emit synchronized position indicating signals when such pedestrians or vehicles are moving in a group, thereby aiding visibility and perception of the group.

In another non-limiting example, the present invention provides means to enhance or multiply the safety features of bicycle or motorcycle illumination. The multiplication factor is simply the number of bicyclists in the group (peloton). Currently, each flashing lamp when not coordinated with the light output of other members of the group provides a fraction of the group's total available battery energy and light output. By providing coordination of the individual flashing lamps the "group" will appear as a much larger and brighter entity, thereby providing safety beyond that available to multiple, independently-flashing bicycles warning lamps.

This invention addresses the advantage provided by coordinating a large number of individual flashing safety lights on a group of moving nodes (for example, bicycles, motorcycles, motor homes, road-side walkers or joggers, etc.). By coordinating the flashing of LED lamps on individual nodes, the "Group" is made to appear larger and more distinctive, thereby providing a safety advantage.

Using radio, infrared, or sound communication, a mesh-network, master-slave, or hybrid communications network, the formerly independent flashing of lamps on moving and non-connected vehicles or pedestrians can be coordinated such that all the lamps flash in unison, or in sequence, or in some other more readily visible pattern.

This invention addresses the challenges associated with coordinating an action (for example, flashing of a lamp) amongst multiple, disparate moving entities. To provide for dynamic position synchrony, the network must account for positional changes as well as signal strength variations owing to multipath reflection off automobiles, trucks, and bicycles. In addition, simultaneous flashing of all the lamps requires network coordination, timing, and the ability for dynamic numbering of network nodes leaving and joining the network.

Figure 1:
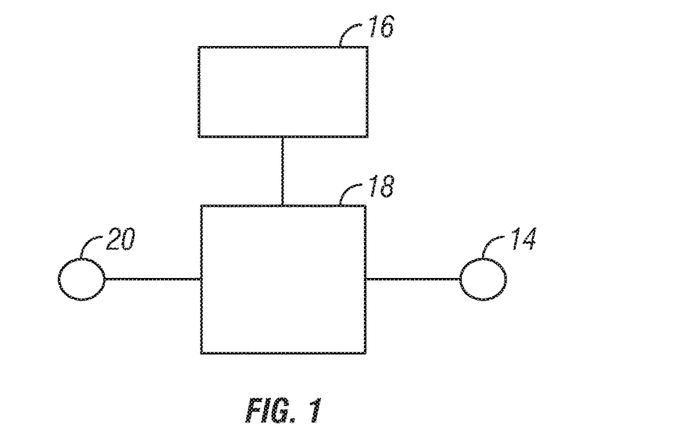
FIG. 1 is a diagram showing the elements of one embodiment of position indicating device of the present invention.
Figure 2:
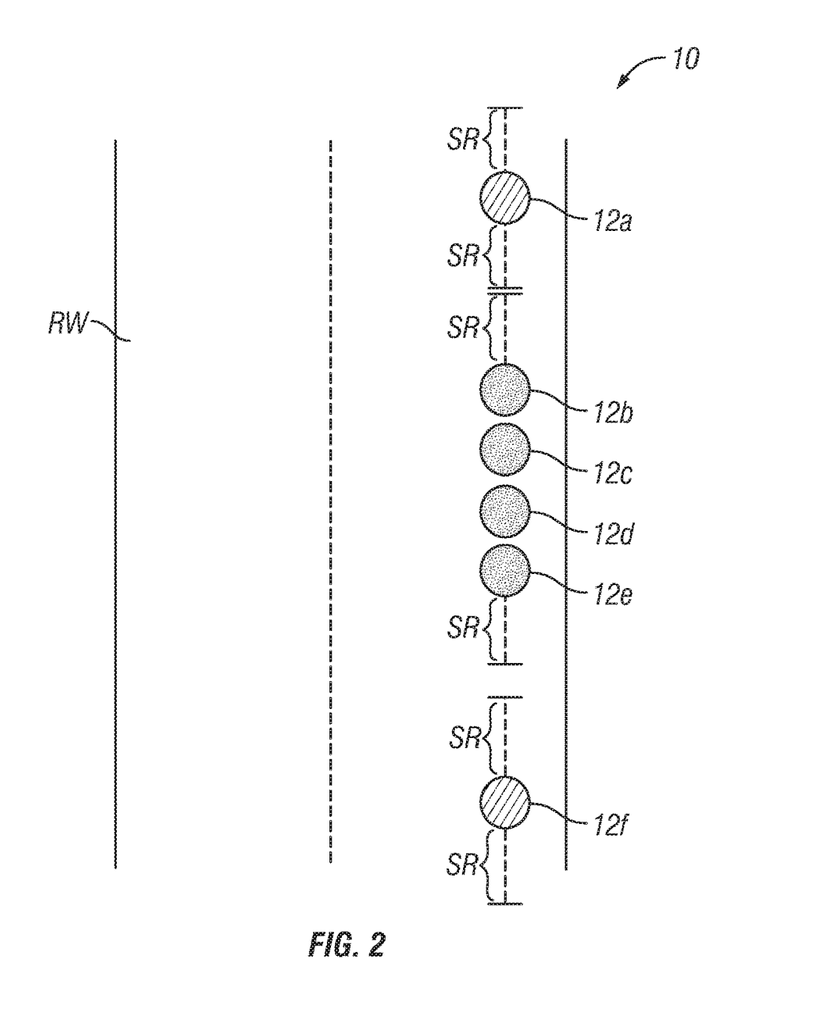
FIG. 2 is a diagram of one embodiment of a system of the present invention comprising a plurality of position indication devices as shown in FIG. 1, attached to or carried by pedestrians or vehicles moving along a roadway or other thoroughfare.

FIG. 1 shows an example of basic elements that may be included in a position indicating device 12 of the present invention. FIG. 2 shows an example of a system (e.g., a network or group) comprising a plurality of position indicating devices 12a through 12f (e.g., each device representing a separate "node") moving in a common direction along a roadway or other thoroughfare RW.

As seen in FIG. 1, each device 12 comprises at least one emitter 16 (such as an LED, other light source, speaker, horn, etc.) which emits a position indicating signal, a radio or other receiver 14 (which may in some embodiments also comprise a transmitter), a power source 20 (e.g., a battery or solar panel) and electronic circuitry 18 (e.g., an integrated circuit having a controller). The electronic circuitry 18 is configured and programmed to receive synchronization signal(s), via the receiver 14, from other such position indicating devices 12 located within a synchronization range SR of the present device 12 and, in response to the receipt of one or more synchronization signal(s) from one or more other position indicating devices 12 located within the synchronization range SR, causing the emitter(s) 16 to emit a signal that is synchronized with signals being emitted by said one or more other position indicating devices 12a through 12f located within the synchronization range SR.

In the example shown in FIG. 2, four of the six devices 12b, 12c, 12d and 12e are within synchronization range SR of one another. Thus, devices 12b, 12c, 12d and 12e are all emitting a synchronized position indicating signal. However, non-grouped devices 12a and 12f are currently outside of the synchronization range SR of all of the other devices in the network or group and, therefore, devices 12a and 12f are either not emitting any signal, or are emitting signals which differ from or are not synchronous with the signals being emitted by the grouped devices 12b, 12c, 12d and 12e.

If one of the non-grouped devices 12a or 12f subsequently becomes within the synchronization range SR of any of the grouped devices 12b, 12c, 12d or 12e, that device will then automatically join the group and will adopt/begin to emit the synchronized position indicating signal along with the other grouped devices 12b, 12c, 12d and 12e.

If one of the grouped devices 12a, 12b, 12c, 12d moves outside of the group's synchronization range SR, that device will then cease to emit the synchronized group position indicating signal and will either become quiescent and not emit any signal or will adopt and begin to emit a different or non-synchronized position indicating signal.

In some embodiments, the synchronized group position indicating signal emitted by the grouped devices 12b, 12c, 12d and 12e may be sequential in nature. For example, flashes of light may be emitted in sequential order from the first device 12b to the last device 12d or from the last device 12d to the first device 12a. In such sequential embodiments, if the order of the grouped devices 12b, 12c, 12d, 12e changes, the devices will be programmed to automatically re-sequence themselves to maintain the desired first-to-last or last-to-first sequence, even though the actual order of the devices within the group has changed change.

Mesh-Network

When multiple bicycles or pedestrians or other vehicles utilizing the same equipment approach each other and are within radio range, one of the radios must assume control to initiate the coordinating signal. However, this same temporary master may soon move out of range. Hence, any other node (bicycle) must be capable of assuming control. Furthermore, as all the devices are programmed exactly the same, there is no predefined "master" or "slave". The network must be able to dynamically hand off control from each member to the next. Hence, the network must act both as a master-slave and as a mesh depending upon range and conflict issues. A novel aspect of this invention is the dynamic shifting between mesh and Master-Slave topologies. A fundamental aspect of this is that all nodes when not within range of another node will, for example, flash the lamp once-per-second. However, two nodes may not be flashing in synchrony even though each is flashing at once-per-second. Once in range, each node will establish the "master" clock to synchronize the emitted signals (e.g., flashes of light).

Figure 3:
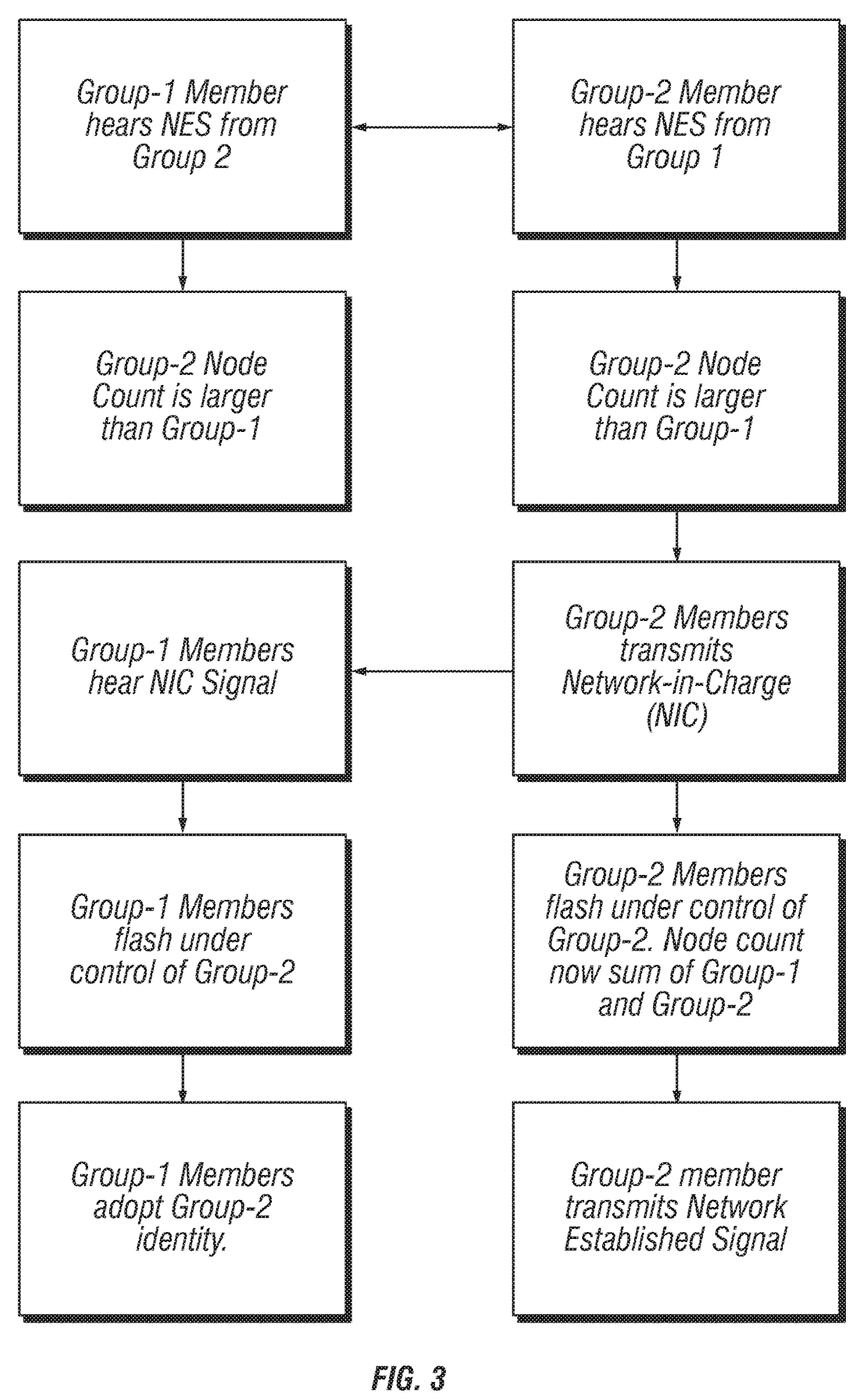
FIG. 3 is a diagram showing one non-limiting example of an operating protocol by which position indicating devices of the present invention may be programmed to operate.

With reference to FIG. 3, one example of an operating scenario is that two nodes approach within range. Each node randomly or coordinated with the LED flash transmits a signal requesting control of the network (Request-Control Signal—RCS) and seeks an acknowledgement. The first node to transmit the request-control signal will take control of the network. Upon receipt of the Request-Control Signal, the second node will a) acknowledge receipt of the signal and b) cease sending out Requests Control Signals and simply go into receive and propagate mode (mesh-network). The second of the two nodes will flash according to instructions and timing from the first (Master-Slave). Both nodes will begin to send out a Network-Established Signal (NES) that is coordinated with the LED flash. The Network-Established Signal will include flash characteristics (time, duration, frequency, etc.) and number of nodes in the network. As additional members of the group move into range, they too will be sending randomly-timed Request-Control Signals. However, the first two nodes, having already established a network, will not respond but will continue to flash and send out Network-Established Signals that includes number of nodes in the network. If a single new node moves within range it will receive a Network-Established Signal with network size=2. This Network-Establish Signal will elicit an acknowledgement that will increase the size of the network to 3 nodes. This parameter, network size, will continue to be propagated to all nodes in the network (mesh-network).

Should a similar series of events occur in an approaching group of cyclists where a network has already been established, then a potential conflict will occur. Both groups, having formed networks independently, will be transmitting Network-Establish Signals. However, one of the parameters is network size. The network with the greater number of nodes, for example (could be smaller node count takes control) will take control of the smaller network. The smaller network will continue transmitting Network-Establish Signals but with a) a new node number that includes the sum of both groups; b) adopt the NES identifier of the larger group; and c) in unison with the larger group.

Merging of Networks

Figure 4:
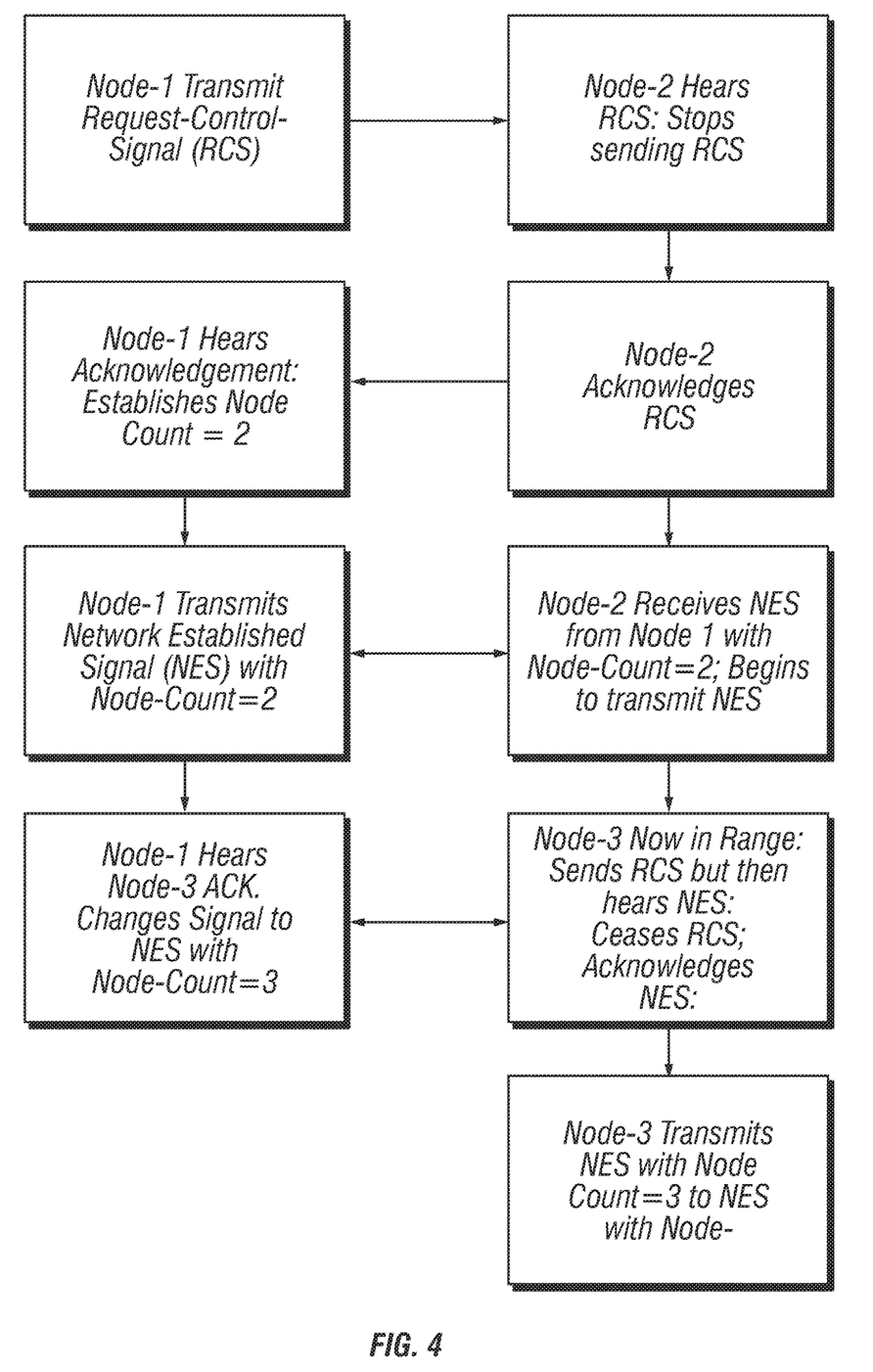
FIG. 4 is a diagram showing a protocol by which position indicating devices of the present invention may be programmed to distinguish between separate groups of pedestrians or vehicles which pass or come near each other.

Referring to FIG. 4, a group of nodes (bicyclists, for example) having formed a network (group) may now come upon another group of nodes also operating as a group. When a device in Group-1 receives a Network Established Signal (NES) from Group-2, the member will compare the node count transmitted by Group-2 with that transmitted from within its own Group-1. (The same is taking place with the Group-2 member). If the node-count of Group-2 is larger, the Group-2 member first receiving the Group-1NES will transmit a Network-in-Charge (NIC) signal with the Group-2 identifier. This signal will be relayed by any node, either Group-1 or Group-2, to other nodes that might not be in range of the initiating Group-1 member (mesh-network). The NIC signal takes precedence over other commands. Once a member of Groups-1 or -2 receive the NIC signal, they will all begin transmitting a Network Established Signal (NES) with Group-2 identifier and with the new Node-Count (sum of Group-1 and Group-2).

As other Groups approach, the same systematic approach to establishing a single Group will take place. Should groups have the same number of nodes, the tie-breaker will be the unique identifier of each node (similar to MAC address). The node with the lower numeric unique identifier will take control. In another embodiment, the higher numeric identifier might take control.

Simultaneous Flashing of Nodes

Figure 5:
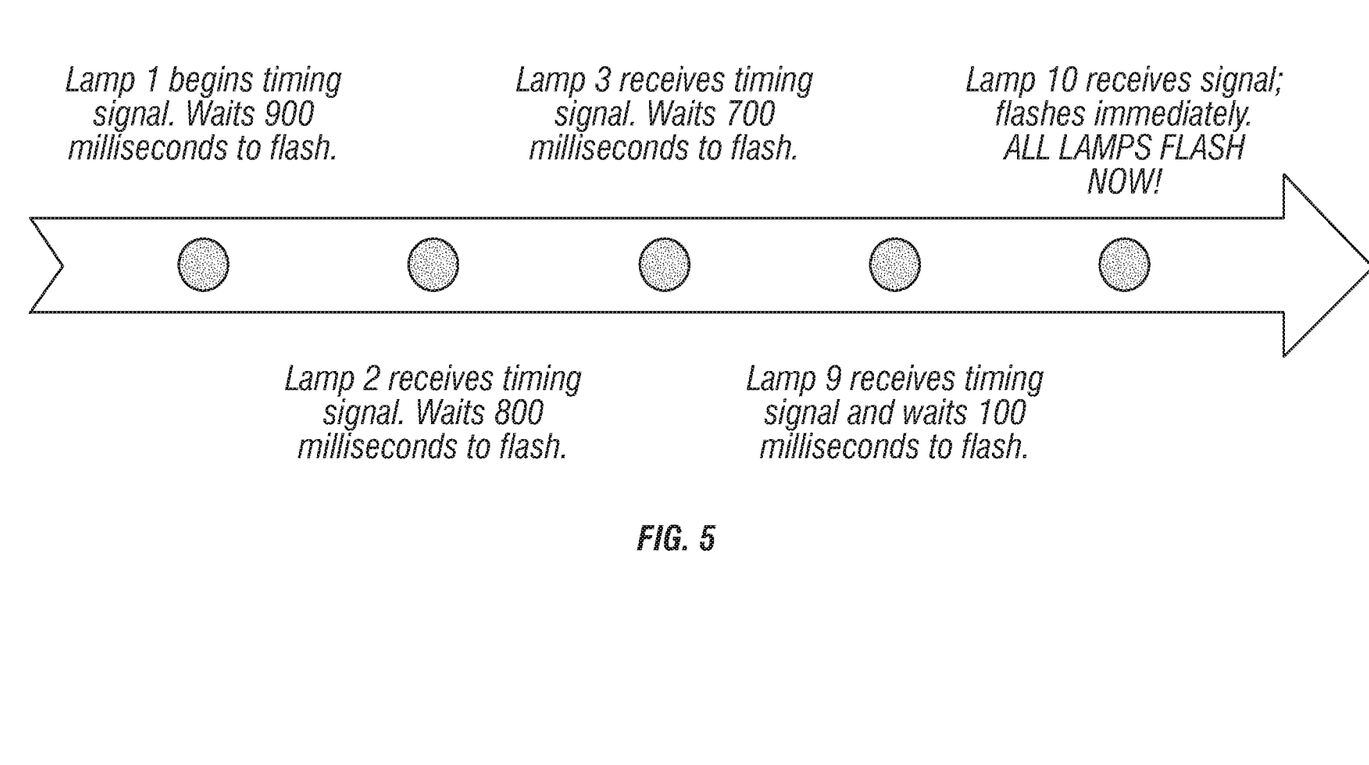
FIG. 5 is a diagram showing one non-limiting example of a mesh network or "master-slave" network which may be used in devices of the present invention.

In systems of the present invention, a mesh network or "Master-Slave" network may be used to coordinate timing. Other modalities include GPS timing signals received via satellite, real-time clock modules, or cellular timing signals or timing signals from Universal Time Transmission (e.g. WWV Fort Collins, Colo. or similar government timing broadcast in Europe or Asia). The technical approach used includes establishing a common clock signal across the network. To simultaneously flash all lamps in the network, the new approach described in this document incorporates a fixed delay between sequence number in the network and the flash of the lamp. For example, using a 10-lamp network, node number 1 sends a signal to its most immediate neighbors defining a timing signal. It then waits 900 milliseconds to flash its lamp. Node number 2 hears the signal and waits 800 milliseconds to flash its lamp. Node number 3 hears the signal and waits 700 milliseconds to flash its lamp. This continues until lamp number 10 receives a clock signal and flashes immediately. The lowered number lamps all are staged to flash at the same time even without direct radio, infrared, ultrasound, or other media communication. Based upon this scheme, all 10 lamps will flash simultaneously. If 11 lamps are in the system, then node 11 will hear the signal from node 10 other nodes and delay its flash for 900 milliseconds. It will flash at the same time as node 1, which is the same as all the other nodes.

The net effect is that despite being out of range of all but one lamp, all the lamps will flash simultaneously; each lamp need not "hear" lamp number 1, or any other number lamp. Using an "association matrix" or neighbor table, each lamp must hear only 1 of the closest 8 lamps; that is, any one of 4 lamps with numbers greater than N or 4 lamps with numbers lower than N.

This is illustrated in Table 1 below:

TABLE 1

| Association Table | | | | | | | | | |
|---|---|---|---|---|---|---|---|---|---|
| a) | O | O | O | O | N | O | O | O | O |
| b) | 1 |   | 0 | 1 | 1 | N | 1 | O | O | O |

In the above Association Matrix illustrated by line b) above, lamp N receives information from 3 lamps with lower sequence number and 1 lamp with higher sequence number. Any one of these lamps can provide the necessary information for lamp N to acquire timing and flash-delay data. Hence, lamp N need not be in range of lamp 1.

To dynamically establishing relative positioning, an "association matrix" or neighbor table is used to efficiently define the absence or presence of neighboring nodes.

Sequential Flashing

An alternative to multiple moving nodes (bicycles, vehicles, pedestrians) flashing lamps in unison is for the lamps to flash in a sequential order from last-in-line to first-in-line. This flash pattern will present a dynamic flashing "arrow" to approaching motorists. To accomplish this, each node must establish its physical location (position) relative to the other nodes. Furthermore, as one bicycle passes another, this position must change dynamically to renumber the nodes.

An alternative algorithm could use the combination of tail-lamp and head-lamp to communicate sequence number from trailing to leading nodes (bicycles, for example). Linking the tail-lamp and head-lamp would allow for a modulated signal to carry position and sequence information in the visible light spectrum, infrared spectrum, using high-frequency sound, or radio communication. The tail-lamp and head-lamp of any one bicycle or other vehicle or pedestrian would communicate with each other via radio (Bluetooth, Wi-Fi, for example), hard wire connection, sound, infrared light, etc. The node number would therefore be transmitted by visible light modulation or infrared-light modulation or sound or radio to the physically closest leading node and physically closest following node. The rear-most tail lamp would not receive a recognized signal from behind, and therefore, would assume the sequence position at the end of the peloton. The head-lamp would send position information to the next bicycle in line. This information would be received by the tail lamp ahead (using a photodetector, phototransistor, photodiode, LED acting as a photodiode when not flashing, etc.). The next member would continue to send its position information to the node ahead, and so on. This architecture would allow for rapid sequencing of multiple lamps. As moving nodes (pedestrians, bicyclists, vehicles) changed position, the new physical location would be established via node number transmitted and received from the tail-lamp and head-lamp.

Master-Slave

Alternatively, and depending upon size of the plastic enclosure of the lamp and length of antenna, a lower frequency (greater range) radio signal may be used. This will allow for deployment of a simple "Master-Slave" system where one node (bicycle) is designated as the Master, and all other nodes are "Slaves". At lower frequencies, the range of the Master will be adequate to control all Slaves within a 2 kilometer or greater range.

Dynamic Flashing Pattern

Once the individual nodes are "linked" by the mesh-network, Master-Slave, or Hybrid network, the rate of LED flash and pattern may be dynamically controlled. For example, with proximity detection using ultrasound, radar, laser reflection, head-light intensity, etc., a vehicle approaching from the rear of the group could be sensed and through micro-controller firmware embedded in the flashing lamp change the flash pattern. Changes could include longer duration duty cycle of flash, brighter flash, more rapid flash, etc. This would alert the approaching driver by providing dynamic patterns rather than a monotonous constant flashing pattern. For example, as the vehicle approaches, the simultaneous flashing of many bicycle tail lamps can increase in brightness and rapidity of flashing and ultimately become a "constant-on" or steady-burn illumination to make the bicyclists most visible. Alternatively, the color of the flashing tail-lamps could change from amber to red, or green, based upon proximity of an approaching vehicle. This dynamic response of the flash pattern to the approaching vehicle represents a novel and important safety feature.

Crowd Synchronized Behavior

Large groups of pedestrians (crowds) wearing devices that emit light or sound or other energy form can be coordinated in a similar fashion. Recent demonstrations of this crowd dynamic behavior have been seen in Olympic stadiums, where wrist bands or head lamps will flash with different color and patterns. In all the demonstrations, however, the coordinating signal is infrastructure dependent, that is, an infrared or radio signal is broadcast from a central location in close proximity to the crowd, and often in line-of-sight of the crowd. The "master" signal may be broadcast by several infrared light sources that are hard-wired to a central control system. In the proposed invention, coordination of crowd node behavior does not require a central infrastructure source or master signal. The control signal can be generated by any node and immediately control the behavior of all nodes in the network. For example, in a large football stadium with 100,000 fans, each carrying a low-cost node, a change of the electronic behavior of each node (LED color, flash rate, intensity, sound emission, etc.) can be coordinated by any single node in the crowd, if programmatically permitted, or by an administrator node sitting in the crowd. The same crowd can exit the stadium and synchronized, coordinated behavior would continue. There is no need for a high-energy, centrally located infrared or radio signal to be in line-of-sight of all the nodes.

Group Behavior Versus Individual Behavior

With successful linking of two or more bicycles, motorcycles, vehicles, pedestrians, etc. (nodes), the flash dynamics could be designed to change. For example, while solo riding, a bicycle taillight might flash for 100 milliseconds once per second. However, when "linked" to another bicycle via radio, infrared, light, or other signaling modality, the taillight might cease flashing and initiated a "Steady Burn" mode where both lamps (two bicycles) stays lit continuously. In a large group, simultaneous flashing might be annoying or less effective than steady illumination of the group. The group can choose one of many "patterns" that will become "default" once a group is formed, and this can be different than the flash pattern when an individual is riding solo. The lamp will have a solo mode and group mode, both programmable by the operator.

Although the invention is described with respect to pedestrians or vehicles which are "moving," it is to be appreciated that in some instances the movement of some or all of the pedestrians or vehicles may stop. For example, a group of pedestrians or cyclists traveling along a roadway may stop from time to time, and then subsequently resume movement.

In some instances, the position indicating devices may remain on and may continue to emit their position indicating signals while the pedestrians or vehicles are stopped. In other instances, the position indicating devices may be turned off while the pedestrians or vehicles are stopped and may then be re-started when the pedestrians or vehicles subsequently resume movement. Also, the reference to moving pedestrians herein shall be construed to include not only pedestrians who are walking, jogging, standing or running but also persons who are performing actions or otherwise moving about within an area, such as workers or emergency personnel who are working in a construction zone or accident site on or near a roadway or other thoroughfare.

It is to be appreciated that, although the invention has been described hereabove with reference to certain examples or embodiments of the invention, various additions, deletions, alterations and modifications may be made to those described examples and embodiments without departing from the intended spirit and scope of the invention. For example, any elements, steps, members, components, compositions, reactants, parts or portions of one embodiment or example may be incorporated into or used with another embodiment or example, unless otherwise specified or unless doing so would render that embodiment or example unsuitable for its intended use. Also, where the steps of a method or process have been described or listed in a particular order, the order of such steps may be changed unless otherwise specified or unless doing so would render the method or process unsuitable for its intended purpose. Additionally, the elements, steps, members, components, compositions, reactants, parts or portions of any invention or example described herein may optionally exist or be utilized in the absence or substantial absence of any other element, step, member, component, composition, reactant, part or portion unless otherwise noted. All reasonable additions, deletions, modifications and alterations are to be considered equivalents of the described examples and embodiments and are to be included within the scope of the following claims.

What is claimed is:

1. A position indicating device which is operable while undergoing movement along with a plurality of other position indicating devices, said position indicating device comprising:
   at least one emitter which emits a position indicating signal;
   a receiver;
   a power source; and
   electronic circuitry configured and programmed to;
   a) receive synchronization signal(s), via the receiver, from other position indicating devices located within a synchronization range of said device; and
   b) in response to the receipt of one or more synchronization signal(s) from one or more other position indicating devices located within the synchronization range, causing said at least one emitter to emit a signal that is synchronized with signals being emitted by said one or more other position indicating devices located within the synchronization range;
   wherein said at least one emitter comprises at least one light emitter which emits visible or infrared light, and which alternately operates in a top emitting mode wherein light is emitted upwardly or a side emitting mode wherein light is emitted laterally and wherein the electronic circuitry comprises switching circuitry configured to cause the device to switch between top emitting mode and side emitting mode.

2. A device according to claim 1 further comprising a housing having one or more side walls which is/are at least partially translucent and one or more top walls which is/are at least partially translucent, and wherein said at least one light emitter alternately emits upwardly directed light through said one or more top walls when operating in top emitting mode or laterally directed light through said one or more side walls when operating in side emitting mode.

3. A device according to claim 1 wherein the switching circuitry comprises a motion activated switching apparatus which causes switching between the side emitting mode and the top emitting mode in response to certain movements of the flare.

4. A device according to claim 3 wherein the motion activated switching apparatus causes dynamic emitter orientation such that the flare switches back and forth between the top emitting mode and side emitting mode as the flare is moved back and forth between a horizontal orientation and a vertical orientation.

5. A device according to claim 3 wherein said at least one emitter comprises a plurality of light emitting diodes.

6. A device according to claim 3 further comprising one or more magnets.

7. A device according to claim 6 wherein, when the device is in a vertical position, the switching circuitry causes the device to operate in top emitting mode and wherein said one or more magnets are usable to attach the device to a ferromagnetic member such that the device is in the vertical position and the switching circuitry causes the device to operate in top emitting mode.

8. A device according to claim 3 wherein the switching circuitry includes a locking function which overrides the motion activated switching apparatus.

9. A device according to claim 8 wherein the locking function allows a user to lock the device in either top emitting mode or side emitting mode.

10. A device according to claim 1 further comprising one or more connectors for attaching the device to an object selected from: vehicles, bicycles, motorcycles, motorbikes, wearable garments, vests, shoes, running shoes, headgear, caps, hats, helmets, hard hats, straps, leg straps, arm straps, belts, back-packs, lanyards, jewelry, ear rings, necklaces and wrist bands.

11. A device according to claim 1 attached to, built into or integrated in an object selected from: vehicles, bicycles, bicycle seats, bicycle lamps, motorcycles, motorbikes, wearable garments, vests, shoes, running shoes, headgear, caps, hats, helmets, hard hats, straps, leg straps, arm straps, belts, back-packs, lanyards, jewelry, ear rings, necklaces and wrist bands.

12. A system comprising a plurality of devices according to claim 1 wherein the electronic circuitry is programmed to operate in said group signaling mode and, when operating in said group signaling mode, to cause the devices within synchronization range of one another to emit signals in unison.

* * * * *